United States Patent [19]
Nakata

[11] 3,951,712
[45] Apr. 20, 1976

[54] METHOD FOR APPLYING HIGH-VOLTAGE ELECTRICAL INSULATION BY FILTERING OUT SUSPENDED PARTICLES FROM A SLURRY

[75] Inventor: Roy Nakata, Pittsfield, Mass.

[73] Assignee: General Electric Company, Philadelphia, Pa.

[22] Filed: Sept. 26, 1974

[21] Appl. No.: 509,504

[52] U.S. Cl. .................... 156/48; 156/49; 156/51; 156/312; 174/84 R
[51] Int. Cl.² .................................. H01B 13/02
[58] Field of Search ............... 156/47, 48, 49, 51, 156/312; 174/76, 84 R, 118; 264/272

[56] References Cited
UNITED STATES PATENTS

| | | | |
|---|---|---|---|
| 1,693,365 | 11/1928 | Boyle et al. | 156/48 |
| 1,835,922 | 12/1931 | Zeiss et al. | 156/48 |
| 1,892,663 | 1/1933 | Delmar | 156/48 |
| 1,939,843 | 12/1933 | Darby | 156/51 |
| 2,463,231 | 3/1949 | Wyatt | 156/49 |
| 2,716,623 | 8/1955 | Tator | 174/84 R |
| 2,792,441 | 5/1957 | Platow | 156/48 |
| 3,017,306 | 1/1962 | Priaroggia | 156/48 |
| 3,318,743 | 5/1967 | Wakefield | 156/48 |
| 3,446,741 | 5/1969 | Hervig et al. | 252/63 |
| 3,846,578 | 11/1974 | Bahder et al. | 174/76 |

*Primary Examiner*—Willaim A. Powell
*Assistant Examiner*—Basil J. Lewris
*Attorney, Agent, or Firm*—William Freedman; J. Wesley Haubner

[57] ABSTRACT

In the disclosed method of applying electrical insulation, a housing with a porous wall is placed around a conductor in spaced relationship thereto, and a slurry is pumped into the space between the housing and the conductor. This slurry comprises a liquid and particles suspended in the liquid having good electrical insulating properties. The liquid component is allowed to discharge from the housing via its pores, but the solid particles are filtered out within the housing so as to build up from the internal surface of the housing a deposit of the particles. This pumping and filtering action is continued until the space between the housing and the conductor is substantially filled with the deposit.

25 Claims, 6 Drawing Figures

METHOD FOR APPLYING HIGH-VOLTAGE ELECTRICAL INSULATION BY FILTERING OUT SUSPENDED PARTICLES FROM A SLURRY

BACKGROUND

This invention relates to a method for applying high-voltage electrical insulation to a conductor and, more particularly, relates to a method of this type in which the insulation is built up in the space around the conductor by filtering out suspended particles of insulating material from a slurry pumped into this space.

One particular application for which my method is especially useful is in providing insulation for a high voltage cable splice. Typically, the insulation in a cable splice has been formed by the careful application of insulating tape or by molding the insulant in situ. Each of these procedures requires a considerable amount of skill for its successful performance and is subject to the additional disadvantage that the resulting insulant often will contain voids that can lead to serious corona problems. Also molding usually requires the application of heat and pressure and relatively expensive materials and equipment.

SUMMARY

An object of my invention is to provide a method of applying insulation, especially, though not exclusively, adapted for cable-splice formation, which requires little skill for its use and results in an exceptionally high density insulation.

Another object is to provide a method of applying high voltage insulation which consumes much less time than the usual taping operation for its completion, especially as applied to cable-splice formation.

Another object is to provide a method of applying insulation in which the applied insulation exhibits excellent conformity with respect to the substrate to which it is applied, thus reducing the likelihood of voids in the insulation, especially at the interface between the substrate and the applied insulation.

Another object is to exclude surrounding air from the insulation being applied during its application, thus reducing the chances for trapping air in the insulation.

In carrying out the invention in one form, I place around a conductor that is to be provided with insulation a housing having a porous wall, and I pump into this housing a slurry comprising a liquid having good electrical insulating properties and particles suspended in the liquid also having good electrical insulating properties. The liquid component of the slurry is allowed to discharge from the housing via the pores in its wall, but the particles are filtered out within the housing so as to build up from the internal surface of the housing wall a deposit of said particles. This pumping and filtering action is continued, thus continuing the build-up of the deposit, until the deposit spans the space between the internal surface of the housing wall and said conductor.

In one embodiment of the invention, the liquid component of the slurry is a conventional cable oil and the solid particles are of a cellulosic material, such as used for Kraft paper.

In accordance with another feature of the invention, the slurry is introduced via a tube that initially projects from the wall of the housing into the region of the conductor, where the discharge end of the tube is located. After at least some of the deposit has built up, and preferably after the deposit spans the space between the housing wall and the conductor, the tube is withdrawn so that its discharge end moves from its initial position to a position near the housing. Pumping of the slurry through the tube is continued when the tube is withdrawn, thus building up additional deposit behind the withdrawn discharge end of the tube.

BRIEF DESCRIPTION OF DRAWINGS

For a better understanding of the invention, reference may be had to the following description taken in conjunction with the accompanying drawings, wherein.

DETAILED DESCRIPTION OF PREFERRED EMBODIMENTS

Figure 1:
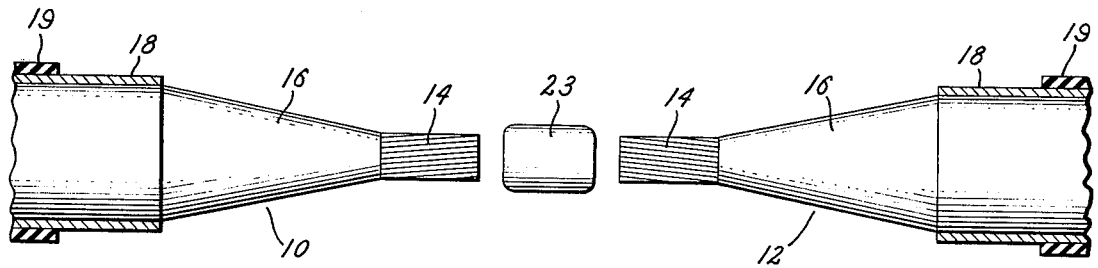
FIG. 1 is a partially sectional view showing two cable sections that are to be joined together by a splice formed in accordance with one form of my invention.

Referring now to FIG. 1, two cable sections that are to be joined together are designated 10 and 12. Since these cable sections are substantially identical, identical reference numerals are used for corresponding parts of each. Each cable section comprises a conductor section 14, insulation 16 surrounding the conductor section, and a tubular metal sheath 18 surrounding the insulation 16. Sheath 18 can be either of sheet, taped, or braided construction. A suitable protective covering 19 of non-metallic material is shown surrounding the sheath 18. Each cable section, as seen in FIG. 1, has been prepared for formation of the splice by removal of insulation 16 from its end to provide an exposed end portion on the conductor section, by removal of some of the metal sheath 18 to provide exposed insulation 16 projecting past the end of the metal sheath, and by removal of some of the protective covering 19 to expose the end of metal sheath 18. The end of insulation 16 is preferably formed into a tapered configuration, as illustrated in FIG. 1. In one embodiment of the invention, insulation 16 is of oil-impregnated paper.

The ends of conductor sections 14 of the two cable sections are first brought together, and, in a conventional manner, a tubular metal coupling 23 in the form of a sleeve, is clamped about the exposed ends to form a good electrical and mechanical joint therebetween, thus forming a completed conductor 14, 23.

Figure 2:
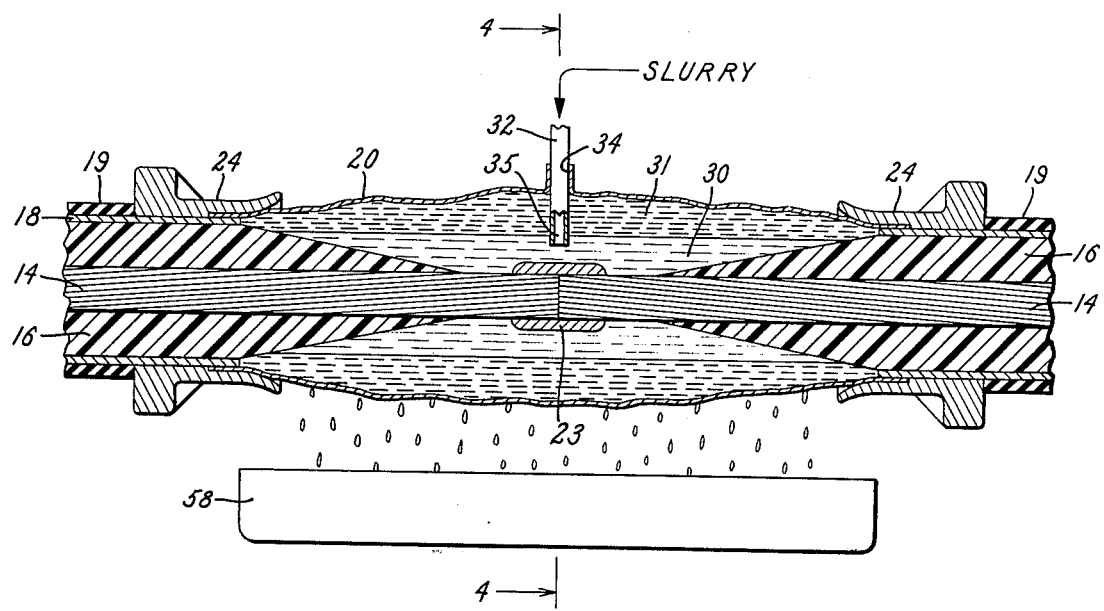
FIG. 2 is a sectional view showing a method embodying one form of my invention. The method is depicted at an intermediate stage of the application of insulation to the splice.

As shown in FIG. 2, the resulting assembly is then placed in a porous housing 20, which in the illustrated embodiment is of metal. The illustrated housing is a sleeve of a coarse woven mesh construction. When the sleeve 20 is in place, its ends are clamped about the sheaths 18 of the cable sections by means of cylindrical clamps 24. Each clamp preferably comprises two semi-cylindrical parts that can be bolted together to provide radially-inward clamping force on sleeve 20 and sheath 18 and also on the underlying insulation 16.

It is necessary in the final cable splice that the space 30 within housing 20 be filled with solid electrical insulation of a high quality sufficient to withstand without breakdown any voltage appearing between high voltage conductor 14, 23 and the housing 20, which is at ground potential. In accordance with my invention, I apply such insulation by pumping into the space 30 a slurry comprising a liquid and particles of electrical insulation suspended in the liquid. The liquid discharges in a generally radially outwardly direction from the space 30 through the pores in the tubular wall of housing 20, but the suspended particles are trapped or filtered out within the housing. Initially, the suspended particles are filtered out by the porous wall of the housing, thus building up an initial deposit on the inside surface of the wall. After this initial deposit has built up, it acts itself to filter out additional particles as the liquid passes therethrough, thus building up additional deposit of progressively increasing thickness. This deposit, at an intermediate stage in the filling operation, is illustrated at 31 in FIG. 2.

In a preferred form of the invention, I pump the slurry into the space 30 through a feed tube 32 that projects through a radially-extending opening 34 in the wall of housing 20. During most of the filling operation, the tube 32 is in its position shown in FIG. 2, i.e., with its discharge end 35 located adjacent the high voltage conductor 14, thus allowing the slurry to enter the space 30 internally of the region bounded by the deposit. The particles contained in the slurry are filtered out as the slurry flows radially outward through the deposit. This pumping and filtering action is continued until the entire space 30 is filled with the above-described deposit 31 of particles from the slurry.

By locating the discharge end 35 of the tube adjacent the high voltage conductor, I am able to prevent the deposit from developing a relatively low density region adjacent the high voltage conductor. As a matter of fact, with the discharge end of the tube so located, the resulting deposit has a greater density adjacent the high voltage conductor than adjacent the wall of housing 20. High density adjacent the conductor is very desirable since typically the highest electrical stress region of the splice is adjacent the high voltage conductor, and it is important that the insulation have a high dielectric strength in this high-stress region. The dielectric strength of the deposit varies directly with its density, and hence its high density adjacent the conductor provides the desired high dielectric strength in this crucial region.

Figure 4:
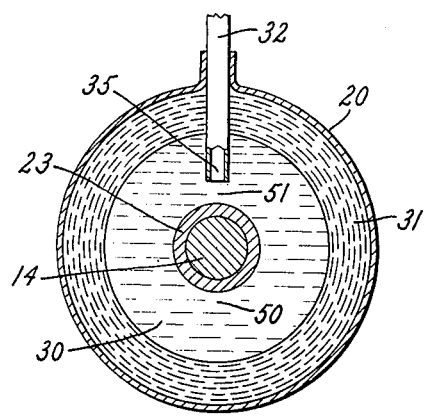
FIG. 4 is a sectional view along the line 4—4 of FIG. 2.
Figure 5:
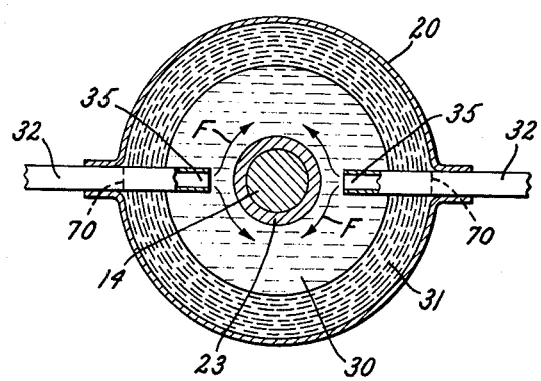
FIG. 5 is a sectional view similar to that of FIG. 4 of a modified form of the invention.

When only a single tube is used for introducing the slurry, as shown in FIG. 4, there is a tendency for the deposit that is applied adjacent the high voltage conductor 14 to be less dense on the side 50 of the conductor opposite the tube discharge end 35 than on the diametrically-opposed side 51 where the tube discharge end is located. To reduce this tendency, I prefer to introduce the slurry through a plurality of tubes, such as shown in FIG. 5, having their discharge ends 35 generally diametrically opposed to each other and discharging in the direction of the arrows. Even greater uniformity and density can be achieved by using more than two tubes, for example, four tubes angularly-spaced by 90 degrees from each other.

Although I have shown the tubes discharging in a radial direction with respect to the central conductor, it is to be understood that they can alternatively discharge tangentially of the conductor 14, thus providing a swirling effect about the conductor periphery, which reduces the tendency of the deposit to develop a low density on the side of the conductor opposite the tube discharge location.

It is to be further understood that the tubes 32 need not be axially aligned. As a matter of fact, it is desirable to use a plurality of axially-spaced tubes for introducing the slurry if a relatively long cable splice is being formed. In forming such a splice, I preferably provide at each of a plurality of axially-spaced locations, a plurality of feed tubes disposed in circumferentially-spaced relationship.

The space occupied by each tube 32 itself should also be filled with insulation in the final splice. Such filling is accomplished by slowly withdrawing the tube 32 while continuing the pumping of slurry through the tube. This results in a deposit building up behind the slowly retreating end 35 of the tube. The liquid component of the slurry pumped in through the tube is able to find its way through the previously deposited material, discharging through the pores in housing 20, but the particles in the slurry are trapped in the space previously occupied by the tube.

Figure 3:
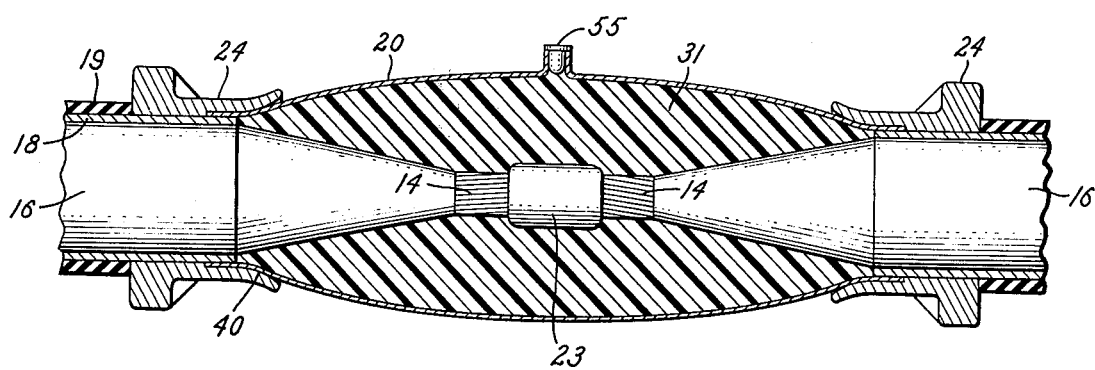
FIG. 3 shows the splice after completion of the method depicted in FIG. 2.

After the tubes are completely withdrawn, suitable plugs are fixed in the openings previously occupied by the tubes to prevent loss of material through these openings. A plug of this type is shown at 55 in FIG. 3.

It is to be understood that soon after pumping begins, the space 30 fills with slurry and, during the entire remaining portion of the insulation-applying process, remains filled with slurry and the material deposited therefrom. After an initial deposit is trapped on the internal wall of the housing, the pressure in the housing 20 rises to and remains in a relatively high range that serves the important purpose of compacting or densifying the deposited material 31 and forcing it to closely conform to the substrate on which it is deposited so as to provide for increased dielectric strength in the final splice. The high pressure also forces the mesh housing 20 to balloon out from its shape of FIG. 2 to that of FIG. 3, thus providing a relatively smoothly contoured ground sleeve around the splice and full contact between the insulation and the ground sleeve, both of which are desired features for the splice. By way of example, a typical pressure that is developed and maintained in the housing 20 during deposition of the insulation is around 50 p.s.i.g. with repetitive superimposed pulses (soon to be described) carrying the pressure up to peaks of around 200 p.s.i.g.

Since the space 30 remains filled during the entire insulation-applying process with the pumped-in slurry and the solid material deposited therefrom, all under pressure, it will be apparent that air from the surrounding ambient is largely excluded from the insulation, thus further reducing the likelihood of voids in the applied insulation. If desired, the slurry can be suitably deaerated by conventional techniques to even further exclude entrapped air.

For controlling the external shape of the splice, the clamps 24 are provided with extended ends that serve as a mold for the end regions of sleeve 20 as they balloon out.

Although I have shown a porous housing 20 that expands as it is filled, it is to be understood that the porous housing could alternatively be of a rigid construction that initially is of the desired size and configuration. In one embodiment of the invention, such a housing is made of sintered-together metal particles. The pores between the metal particles provide passageways for the liquid component to flow through the housing wall.

In one embodiment of my invention, the liquid component of the slurry is the usual oil used for insulating purposes in electric cables that have paper-oil insulation, and the suspended particles in the slurry are of a cellulosic material such as used for paper. The particles can be in the form of fibres, or flakelets, or even generally sperical bits. Moreover, the particle form can be varied as the filling operation proceeds. In one embodiment of the invention, I use relatively long, coarse fibres during the initial filling stage so as to facilitate initial deposition of insulation on housing 20. After this initial deposit is developed, shorter and finer fibres are employed so as to contribute to increased density in the deposit.

When fibres or flakelets are used as the solid particles, they are deposited with their long dimension extending generally parallel to the adjacent portion of the cylindrical wall of housing 20. On a larger scale, the deposit itself appears to build up in layers also extending generally parallel to the adjacent portion of the housing wall. Stated in another way, these layers are generally concentric with the internal wall of the housing 20. The particles and the layers of deposit are densely compacted by the internal pressure within the housing. This disposition of the densely-compacted particles and the layers is especially desirable from a dielectric strength viewpoint since the particles and layers extend approximately perpendicular to the force lines of the electric field that is present between the conductor 14, 23 and the surrounding housing 20 when cable is energized. It is believed that such a disposition forces any charges migrating between parts 14, 23 and 20 of the energized cable to follow especially long and circuitous paths, and this is conducive to improved dielectric strength.

Along the interface between the original insulation 16 and the deposited insulation 31, a high dielectric strength is maintained because of the high degree of conformity of the deposited insulation on the original insulation resulting from the compacting of the applied insulation thereagainst by the hydraulic pressure present during formation.

There are many types of insulating material suitable for the suspended particles. Two additional examples are fibres of poly (diphenylphenylene oxide) resin and poly (dimethylphenylene oxide) resin. High quality insulation has been applied using a slurry of each of these types of fibres suspended in cable oil.

In one type of cable that I am concerned with, the cable, while in operation, is contained in a housing (not shown) filled with oil under pressure. The above-described splice is also located within this pressurized oil. Thus, the pressurized oil not only maintains the original paper insulation 16 thoroughly impregnated with oil and under pressure, but also acts in the same way on the deposit 31. This pressurized oil reaches the deposit 31 not only through the interface between the original insulation 16 and the deposit 31 but also through the pores in housing 20.

Although I prefer to use oil as the liquid component of the slurry, other liquids can instead be used, e.g., a silicone dielectric fluid such as that sold by Dow-Corning Corp. as its Dow-Corning 200 dielectric fluid.

In still another embodiment of our invention, the liquid in the slurry is an uncured thermosetting resin containing the suspended particles. Pumping and filtering proceeds as above described to fill the space 30, after which any resin left behind in the space 30 is cured by suitably heating the splice. An example of such a slurry system is one containing uncured epoxy resin as the liquid component and flakelets of mica as the solid component. Other suitable solids, either organic or inorganic, may be used in addition to or in place of the mica, e.g., cellulosic material or silica.

In still another embodiment, the liquid component of the slurry is a volatile fluid, and after being pumped into the cavity, this volatile fluid flows out through the pores in the surrounding housing both in liquid and vapor form. An example of such a slurry is one containing a suitable alcohol, such as methyl alcohol or isopropyl alcohol, as the liquid component and particles of polyethylene in flakelet form as the solid component. Another example is a slurry containing a fluorocarbon such as dichlorodifluoromethane (i.e., Freon 12) as the liquid component and polyethylene as the solid component. Subsequent vacuum and heat can be used to remove all of the vehicle fluid from the deposit. Thereafter, the deposit is suitably impregnated, as by using liquid nitrogen as an impregnating agent for a cryogenic application.

Figure 6:
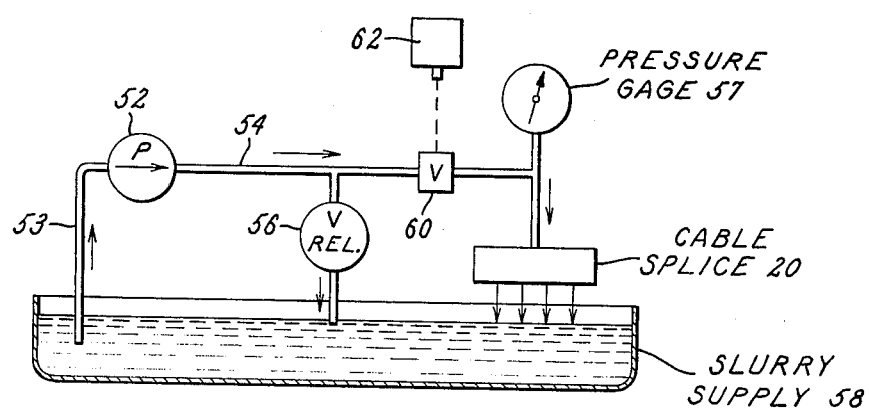
FIG. 6 is a diagrammatic showing of a slurry-handling system used in practicing the method of the invention.

A system for handling the slurry is diagrammatically illustrated in FIG. 6. This system comprises a slurry supply 58 and a positive displacement pump 52 which pumps slurry from the supply 58 into the housing 20 of the splice via supply lines 53, 54. The liquid discharged from the splice housing is returned to and suitably collected in the slurry supply 58. Hydraulically in parallel with the splice is a normally closed pressure relief valve 56 which opens to provide a bypass around the splice when the pressure therein reaches a predetermined value, as would be indicated on pressure gauge 57. The discharge from pressure relief valve 56 is also returned to the supply 58. Suitable means (not shown) are provided for replenishing the supply of solid particles in the slurry and for thoroughly mixing the particles with the liquid component of the slurry.

It has been found that greater and more uniform density can be achieved in the insulation by applying added pressure to the slurry in repetitive pulses. These pulses are effective in compacting the deposited insulation and have less tendency to damage the original insulation 16 of the cable than does a steady high pressure. The previously-described radial compression of the original cable insulation 16 by the clamps 24 serves to further protect this cable insulation 16 by confining the pressure surges to the region between the clamps and preventing any substantial portion of them from being transmitted into the original cable insulation outside the region between the clamps.

For producing the above described pressure pulses, I provide in one embodiment suitable flow-control means such as a rotary valve 60 which repetitively opens and closes as it is rotated by a suitable motor 62. Alternatively, I can use for the pump 52 a reciprocating pump that inherently produces the desired pressure surges, thus allowing the component 60, 62 to be dispensed with. As still another alternative, I can repetitively open and close the bypass valve 56. In such a system, the valve 60 would be omitted.

While introducing the slurry at a location disposed internally of the deposited insulation (as shown in FIGS. 2, 4, and 5) results in a preferred density distribution (considered radially of the splice), it is to be understood that my invention in its broader aspects is not so limited and comprehends introducing the slurry through one or more ports located adjacent the housing 20. This can be done by positioning the tubes 32 of FIG. 5 during the entire filling operation with their discharge ends in the dotted line positions 70 of FIG. 5. In this modification the deposit still forms initially on the inner wall of porous housing 20 and builds up in a radially inward direction. The incoming slurry is forced to flow through this deposit to reach the region around the conductor 14, 23. This modified procedure, while simpler than the others, is more limited in the thickness of high quality insulation which it can produce in a given time period; but excellent quality insulation ½ inch in thickness has been produced using this modified procedure.

Advantages of my insulation-applying method as compared to taping are that my method requires little specialized skill for its use since there is little careful hand work involved in the actual forming and applying of my insulation and also my method consumes much less time than taping for building up high-quality high-voltage insulation, especially as applied to cable splicing.

While I have described this insulation-applying process as being used in conjunction with the conductor of a cable splice, it is to be understood that the insulation for the conductors of many other types of equipment can be applied by basically this same process. The invention in its broader aspects is therefore not limited to use in cable splices.

While I have shown and described particular embodiments of my invention, it will be obvious to those skilled in the art that various changes and modifications may be made without departing from my invention in its broader aspects; and I, therefore, intend in the appended claims to cover all such changes and modifications as fall within the true spirit and scope of my invention.

What I claim as new and desire to secure by Letters Patent of the United States is:

1. A method of applying high voltage electrical insulation to an electrical conductor, comprising:
    a. providing about said conductor a housing having a porous wall spaced from and generally surrounding the conductor,
    b. pumping into said housing a slurry comprising a liquid and particles suspending in said liquid having good electrical insulating properties,
    c. allowing the liquid component of said slurry to discharge from said housing via the pores in said wall but filtering out said particles within said housing so as to build up from the internal surface of said housing wall a deposit of said particles,
    c'. blocking discharge of the components of said slurry from said housing sufficiently to develop within said housing pressures substantially exceeding those surrounding said housing,
    d. continuing said pumping and filtering action and thereby continuing the build-up of said deposit until the deposit spans the space between said internal surface of said housing wall and said conductor.

2. The method of claim 1 in which said pumping and filtering action is continued until the space between the internal surface of said housing wall and said conductor is substantially filled with said deposit.

3. The method of claim 2 in which said liquid component is an oil with good electrical insulating properties and said particles are of cellulosic material.

4. The method of claim 2 in which said liquid component is an oil with good electrical insulating properties and said particles are of a resin.

5. The method of claim 1 in which:
    a. the slurry entering said housing is introduced via a tube which initially projects from said wall into the region of said conductor and has a discharge end located adjacent said conductor,
    b. after at least some of said deposit has built up, said tube is withdrawn so that its discharge end moves from its initial position to a position nearer said housing,
    c. pumping of said slurry through said tube is continued when the tube is withdrawn, thereby building up additional deposit behind the withdrawn discharge end of said tube.

6. The method of claim 5 in which pressure within said housing during the build-up of said deposit is applied in repetitive pulses.

7. The method of claim 1 in which said liquid component is an oil with good electrical insulating properties and said particles are of cellulosic material.

8. The method of claim 1 in which said liquid component is an oil with good electrical insulating properties and said particles are of a resin.

9. The method of claim 1 in which said liquid component is a material having good electrical insulating properties.

10. The method of claim 1 in which
    a. the liquid component of the slurry entering said housing is a resin in an uncured state and
    b. the resin remaining in said housing is cured after said deposit has built up therein.

11. The method of claim 1 in which said liquid is a volatile fluid that partially evaporates within said housing and said particles are of a resin.

12. The method of claim 11 in which the deposit is later impregnated with another liquid having good electrical insulating properties.

13. The method of claim 1 in which:
    a. the slurry entering said housing is introduced via a plurality of tubes circumferentially spaced apart about said housing and initially projecting from the wall of said housing into the region of said conductor, with the discharge end of each tube located adjacent said conductor,
    b. after at least some of said deposit has built up, said tubes are withdrawn so that the discharge end of each tube moves from its initial position to a position nearer said housing,
    c. the pumping of slurry through said tubes is continued when the tubes are withdrawn, thereby building up additional deposit behind the withdrawn discharge ends of said tubes.

14. The method of claim 1 in which said slurry is introduced into said housing via at least one discharge port located at said wall.

15. The process of claim 1 in which said particles are of a fiber form.

16. The method of claim 1 in which said particles used for the initial deposit on said wall are relatively coarse and those used for subsequent deposit are relatively fine.

17. The method of claim 1 in which pressure within said housing during the build-up of said deposit is applied in repetitive pulses.

18. A process of making a splice between two sections of high voltage cable, each comprising: a conductor section and original electrical insulation surrounding said conductor section, the conductor section having an exposed end extending beyond the end of said original insulation, said process comprising:
- a. electrically and mechanically joining the exposed ends of said conductor sections to form a conductor, and
- b. utilizing the method of claim 1 to apply insulation around said conductor in the space between the ends of said original insulation,
- c. said housing being positioned to surround said conductor and extend between the ends of said original insulation during application of said insulation.

19. The process of claim 18 in which:
a. said original insulation is paper-oil, and
b. said liquid component is oil and said particles are of cellulosic material.

20. The process of claim 18 in which:
a. said original insulation is paper-oil, and
b. said liquid component is oil and said particles are of a resin.

21. The process of claim 18 in which said liquid component is oil and said particles are of cellulosic material.

22. The process of claim 18 in which said liquid component is oil and said particles are of a resin.

23. The process of claim 18 in which pressure within said housing during the build-up of said deposit is applied in repetitive pulses.

24. The process of claim 18 in which during the build-up of said deposit, radially-inwardly acting force is applied to said original insulation in locations immediately adjacent said splice so as to isolate more remote original insulation from the pressures developed within said splice during said deposit build-up.

25. The process of claim 18 in which:
a. during the build-up of said deposit, radially-inwardly acting force is applied to said original insulation in locations immediately adjacent said splice so as to isolate more remote original insulation from the pressures developed within said splice during said deposit build-up, and
b. pressure within said housing during the build-up of said deposit is applied in repetitive pulses.

* * * * *